US008358399B2

(12) United States Patent
Lee et al.

(10) Patent No.: US 8,358,399 B2
(45) Date of Patent: Jan. 22, 2013

(54) ELECTRICALLY-DRIVEN LIQUID CRYSTAL LENS AND STEREOSCOPIC DISPLAY DEVICE USING THE SAME

(75) Inventors: Byung Joo Lee, Gyeonggi-do (KR); Hee Jin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1056 days.

(21) Appl. No.: 12/259,730

(22) Filed: Oct. 28, 2008

(65) Prior Publication Data

US 2009/0153653 A1    Jun. 18, 2009

(30) Foreign Application Priority Data

Dec. 14, 2007 (KR) ............... 2007-130926

(51) Int. Cl.
G02F 1/13 (2006.01)

(52) U.S. Cl. .......... 349/200; 349/15; 349/141; 349/149; 349/74; 349/152; 348/59

(58) Field of Classification Search ............ 348/59; 349/200, 15, 141, 149–152, 74
See application file for complete search history.

(56) References Cited

U.S. PATENT DOCUMENTS

| | | | | |
|---|---|---|---|---|
| 7,872,694 | B2* | 1/2011 | Im ........................ | 349/15 |
| 8,149,342 | B2* | 4/2012 | Ijzerman et al. .............. | 349/15 |
| 2005/0270956 | A1* | 12/2005 | Wada et al. ............. | 369/112.01 |
| 2006/0098296 | A1* | 5/2006 | Woodgate et al. ............ | 359/642 |
| 2006/0146208 | A1* | 7/2006 | Kim ................. | 349/15 |
| 2007/0128850 | A1* | 6/2007 | Terasaki et al. ............. | 438/629 |
| 2007/0183015 | A1* | 8/2007 | Jacobs et al. .................. | 359/245 |
| 2007/0187689 | A1* | 8/2007 | Oh et al. ........................ | 257/72 |
| 2007/0195410 | A1* | 8/2007 | Yun et al. ..................... | 359/464 |
| 2008/0151168 | A1* | 6/2008 | Sekiguchi .................... | 349/142 |
| 2008/0252720 | A1* | 10/2008 | Kim et al. ...................... | 348/59 |
| 2009/0122210 | A1* | 5/2009 | Im .................................. | 349/15 |
| 2009/0168187 | A1* | 7/2009 | Woodgate et al. ............ | 359/623 |

FOREIGN PATENT DOCUMENTS

| | | | | |
|---|---|---|---|---|
| CN | 101025490 A | | 8/2007 | |
| JP | 05-100201 | * | 4/1993 | ............. 349/200 |
| JP | 2853276 B | | 11/1998 | |

* cited by examiner

Primary Examiner — Tonia L. M. Dollinger
Assistant Examiner — June Sison
(74) Attorney, Agent, or Firm — Morgan, Lewis & Bockius LLP

(57) ABSTRACT

An electrically-driven liquid crystal lens wherein electric connection between finely split electrodes and signal lines used to apply signals to the split electrodes can be accomplished using a minimal number of masks and signals can be applied to the finely split electrodes without line resistance, and a stereoscopic display device using the same are disclosed. The liquid crystal lens includes first and second substrates arranged opposite each other and each defining a plurality of lens regions, a plurality of metal lines formed on the first substrate, a first insulating film formed on the first substrate, a plurality of first electrodes formed on the first insulating film in the respective lens regions to intersect the plurality of metal lines, a second insulating film formed on the first electrodes, a plurality of second electrodes formed on the second insulating film at positions alternating with the first electrodes, a first contact structure between the first electrodes and the metal lines using a transparent electrode pattern of the same layer as the second electrodes, a second contact structure between the second electrodes and the plurality of metal lines, a common electrode formed over the entire surface of the second substrate, and a liquid crystal layer filled between the first substrate and the second substrate.

14 Claims, 22 Drawing Sheets

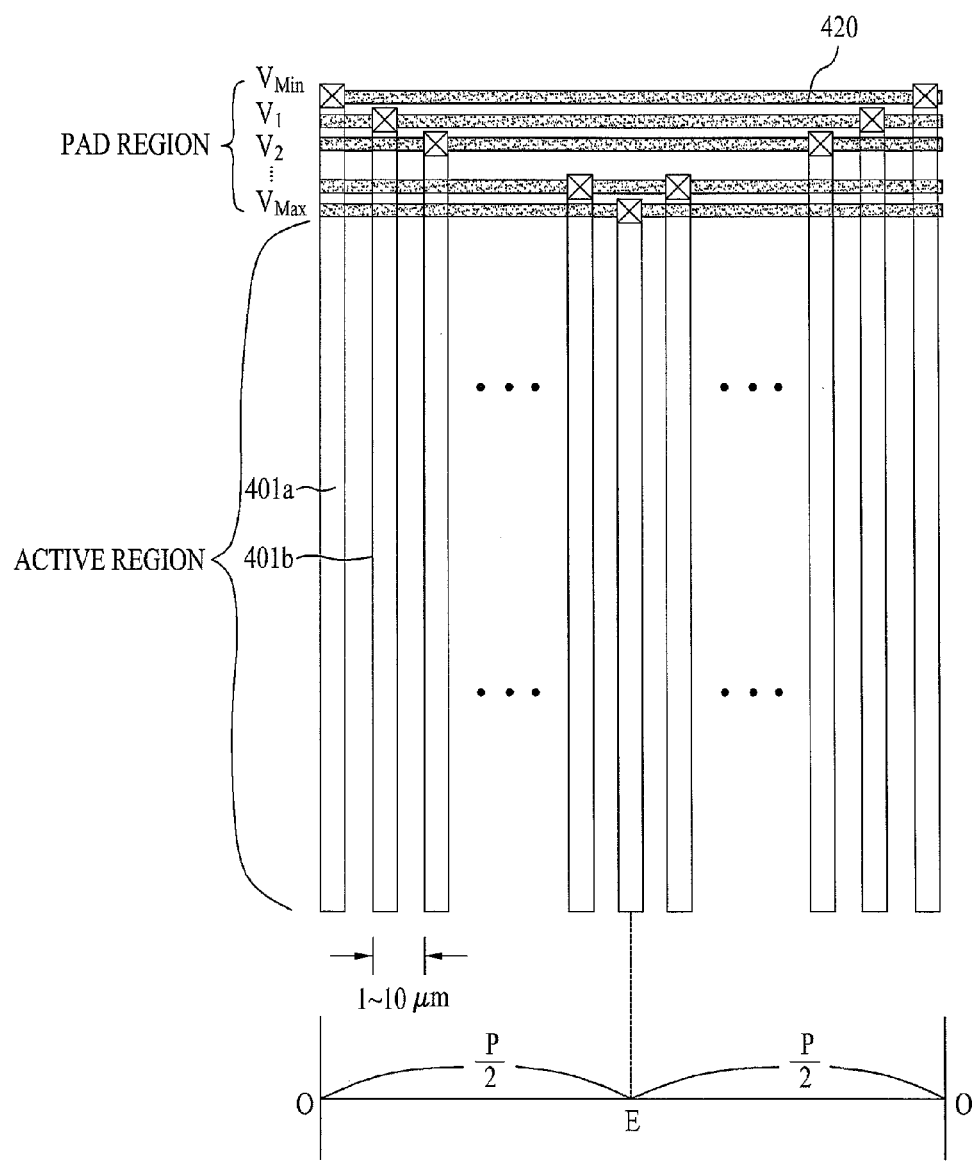

ELECTRICALLY-DRIVEN LIQUID CRYSTAL LENS AND STEREOSCOPIC DISPLAY DEVICE USING THE SAME

This application claims the benefit of the Korean Patent Application No. P2007-130926, filed on, Dec. 14, 2007, which is hereby incorporated by reference as if fully set forth herein.

BACKGROUND OF THE INVENTION

1. Field of the Invention

The present invention relates to a stereoscopic display device, and more particularly, to an electrically-driven liquid crystal lens wherein electric connection between finely split electrodes and signal lines used to apply signals to the split electrodes can be accomplished using a minimal number of masks and wherein signals can be applied to the finely split electrodes without the effect of line resistance, and a stereoscopic display device using the same.

2. Discussion of the Related Art

At present, services for rapid dissemination of information, constructed on the basis of high-speed information communication networks, have developed from a simple "listening and speaking" service, such as current telephones, to a "watching and listening" multimedia type service on the basis of digital terminals used for high-speed processing of characters, voice and images, and are expected to be ultimately developed into cyberspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference therebetween. Such a difference between images due to the positional difference of the eyes is called binocular disparity. A 3-dimensional stereoscopic image display device is designed on the basis of binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately fuses the images, giving the impression of real 3-dimensional images. This ability is conventionally called stereography.

Technologies for displaying the above-described 3-dimensional stereoscopic images may be classified into a stereoscopic display type, volumetric measurement type, and hologram type. Of these types, the stereoscopic display type may be classified into two types, one using 3D glasses and the other not using glasses. In turn, the type not using glasses may be classified, based on the shape of a structure used for 3D realization, into a parallax barrier type and a lenticular type. A discussion of lenticular type stereoscopic displays follows.

Hereinafter, a conventional lenticular type stereoscopic liquid crystal display device will be described with reference to the drawings.

FIG. 1 is a perspective view illustrating a conventional lenticular type stereoscopic liquid crystal display device, and FIG. 2 is a sectional view illustrating the stereoscopic liquid crystal display device of FIG. 1.

As shown in FIG. 1, the conventional lenticular type stereoscopic liquid crystal display device includes a liquid crystal panel 10 consisting of upper and lower substrates 10a and 10b with liquid crystals 10c filled therebetween, a backlight unit 20 located at a back surface of the liquid crystal panel 10 and serving to direct light toward the liquid crystal panel 10, and a lenticular plate 30 located at a front surface of the liquid crystal panel 10 and serving to realize stereoscopic images.

As shown in FIG. 2, first and second polarizers 11 and 12 are attached to an upper surface of the upper substrate 10a and a lower surface of the lower substrate 10b, respectively.

The lenticular plate 30 is fabricated by forming a material layer, having a convex-lens-shaped upper surface, on a flat substrate.

When images, having passed through the liquid crystal panel 10, exit the lenticular plate 30, the viewer's eyes perceive different groups of images, whereby 3-dimensional stereoscopic images can be realized.

In the above-described conventional stereoscopic liquid crystal display device, the lenticular plate 30 and liquid crystal panel 10 are supported by structures (not shown), and the first polarizer 11 on the liquid crystal panel 10 is spaced apart from the lenticular plate 30 by a predetermined distance.

With this configuration, however, the liquid crystal panel 10 or the lenticular plate 30 may droop or bend into a space between the first polarizer 11 on the liquid crystal panel 10 and the lenticular plate 30. This bending phenomenon results in abnormal optical pathways through the backlight unit 20, liquid crystal panel 10, and lenticular plate 30, thereby deteriorating image quality.

To reduce the space between the liquid crystal panel 10 and the lenticular plate 30, inserting an adhesive between the liquid crystal panel 10 and the lenticular plate 30 to attach the liquid crystal panel 10 and lenticular plate 30 to each other might be considered. However, the greater the area of the liquid crystal panel 10, the greater the required amount of the adhesive. Moreover, the adhesive problematically causes deterioration in transmissivity.

Other problems associated with the attachment of the above-described lenticular lens include the use of the adhesive, deteriorated visual sensitivity due to the bending phenomenon, or a difficulty in the processing of a smooth lenticular lens.

For these reasons, in lieu of rounding a lens plane to a convex plane, there has been introduced an electrically-driven liquid crystal lens wherein liquid crystals, filled between upper and lower substrates, undergo a difference in optical pathways thereof depending on an electric potential plane when an electric field is applied to the liquid crystals.

In the above-described electrically-driven liquid crystal lens, however, due to line resistance induced by line-shaped electrodes, the greater the size of the electrically-driven liquid crystal lens, the greater the probability of a difference in voltages applied to upper and lower ends of the electrically-driven liquid crystal lens.

Further, when arranging electrodes in two layers, processes for forming contacts between electrodes and signal lines of the respective layers are required. This increases the number of masks used and consequently, the number of corresponding exposure and developing processes, resulting in deterioration in production yield.

SUMMARY OF THE INVENTION

Accordingly, the present invention is directed to an electrically-driven liquid crystal lens and a stereoscopic display device using the same that substantially obviate one or more problems due to limitations and disadvantages of the related art.

An object of the present invention is to provide an electrically-driven liquid crystal lens wherein electric connection between finely split electrodes and signal lines used to apply signals to the split electrodes can be accomplished using a minimal number of masks and wherein signals can be applied to the finely split electrodes without the effect of line resistance, and a stereoscopic display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrically-driven liquid crystal lens comprises: first and second substrates arranged opposite each other and each defining a plurality of lens regions to correspond to lens regions of the other substrate; a plurality of metal lines formed on the first substrate at one side thereof; a first insulating film formed on the first substrate including the metal lines; a plurality of first electrodes formed on the first insulating film in the respective lens regions, to intersect the plurality of metal lines; a second insulating film formed on the first electrodes; a plurality of second electrodes formed on the second insulating film including the first electrodes at positions alternating with the first electrodes with respect to the respective lens regions; a first contact structure between the first electrodes and the plurality of metal lines using a transparent electrode pattern of the same layer as the second electrodes; a second contact structure between the second electrodes and the plurality of metal lines; a common electrode formed over the entire surface of the second substrate; and a liquid crystal layer filled between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a plan view illustrating another embodiment of a connection relationship between signal lines and electrodes of the electrically-driven liquid crystal lens according to the present invention;

DETAILED DESCRIPTION OF THE INVENTION

Reference will now be made in detail to an electrically-driven liquid crystal lens and a stereoscopic display device using the same according to the preferred embodiments of the present invention, examples of which are illustrated in the accompanying drawings. Wherever possible, the same reference numbers will be used throughout the drawings to refer to the same or like parts.

Figure 3:
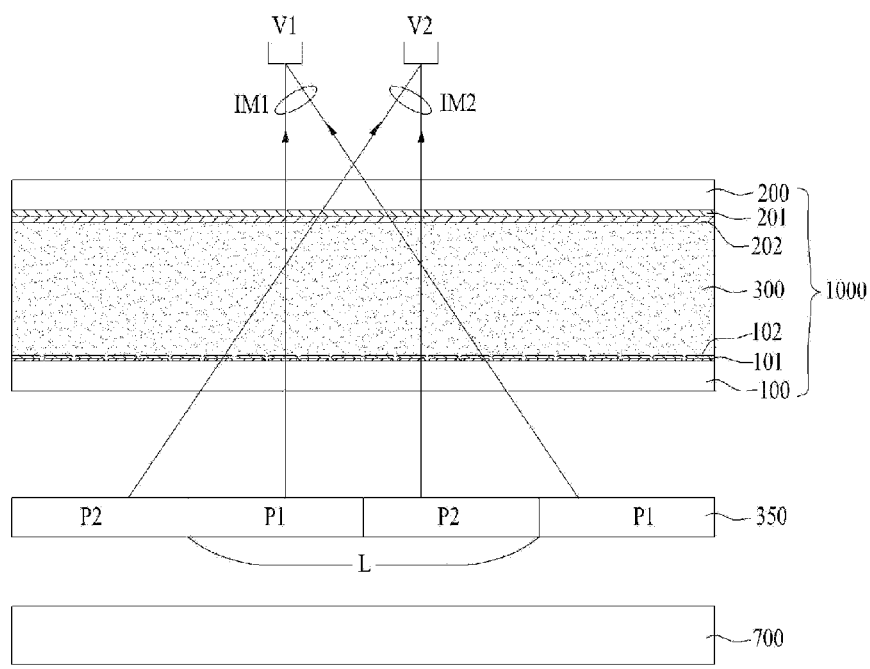
FIG. 3 is a sectional view illustrating a stereoscopic display device including an electrically-driven liquid crystal lens according to the present invention.
Figure 4:
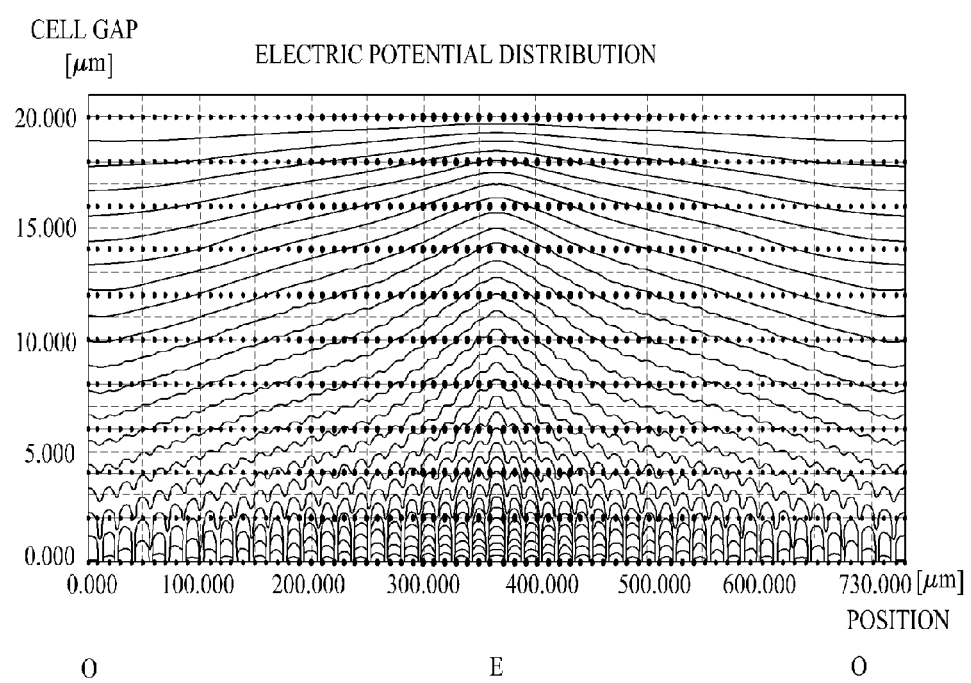
FIG. 4 is a simulation diagram illustrating electric potential distribution and cell gap depending on a distance of the electrically-driven liquid crystal lens of FIG. 3.
Figure 5:
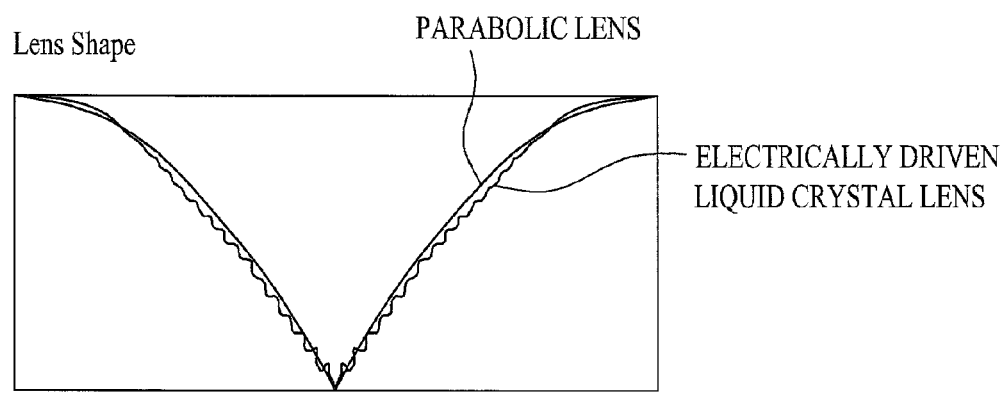
FIG. 5 is a view comparing the electrically-driven liquid crystal lens of FIG. 4 with a parabolic lens.

FIG. 3 is a sectional view illustrating a stereoscopic display device including an electrically-driven liquid crystal lens according to the present invention. FIG. 4 is a simulation diagram illustrating electric potential distribution and cell gap depending on a distance of the electrically-driven liquid crystal lens of FIG. 3. FIG. 5 is a view comparing the electrically-driven liquid crystal lens of FIG. 4 with a parabolic lens.

As shown in FIG. 3, the stereoscopic display device according to the present invention includes an electrically-driven liquid crystal lens 1000, which is driven upon receiving voltages to thereby function as a lens, a display panel 350, which is disposed below the electrically-driven liquid crystal lens 1000 and serves to emit 2-dimensional image information, and a light source 700, which is disposed below the display panel 350 and serves to direct light to the display panel 350.

As occasion demands, if the display panel 350 is a self-illuminating device, omission of the light source 700 is possible.

The display panel 350 contains first and second image pixels P1 and P2 alternately and repeatedly arranged to display first and second images IM1 and IM2, respectively. The display panel 350 can be selected from various flat-panel displays including a Liquid Crystal Display (LCD), Organic Light Emitting Display (OLED), Plasma Display Panel (PDP), Field Emission Display (FED), etc. The display panel 350 is located below the electrically-driven liquid crystal lens 1000, and serves to transmit 2-dimensional image signals to the electrically-driven liquid crystal lens 1000.

The electrically-driven liquid crystal lens 1000 according to the present invention functions, similar to a lens profile, to emit 3-dimensional image signals via 2-dimensional image signals. The electrically-driven liquid crystal lens 1000 is located above the display panel 350 realizing 2-dimensional images, and functions to selectively emit 3-dimensional image signals, or to directly emit 2-dimensional image signals without conversion, according to whether or not voltages are applied thereto. Specifically, the electrically-driven liquid crystal lens 1000 has the feature of directly transmitting light when no voltage is applied thereto and thus, can serve as a switching device to display 2-dimensional images when no voltage is applied thereto and display 3-dimensional images when voltages are applied thereto.

Hereinafter, the electrically-driven liquid crystal lens 1000 will be described in more detail.

As shown in FIG. 3, the electrically-driven liquid crystal lens 1000 according to the embodiment of the present invention includes first and second substrates 100 and 200 arranged opposite each other and each defining a plurality of lens regions to correspond to those of the other substrate, a plurality of first electrodes 101 arranged on the first substrate 100 based on the respective lens regions with the same interval, a second electrode 201 formed over the entire surface of the second substrate 200, voltage signal sources Vmin, V1, V2, . . . Vmax to apply different voltages to the respective first electrodes 101, and a liquid crystal layer 300 filled between the first substrate 100 and the second substrate 200.

The first and second electrodes 101 and 201 are made of transparent metals, and prevent loss of transmissivity at locations thereof.

With respect to each lens region L, a first voltage Vmin, which is equal to an approximate threshold voltage, is applied to the center O of the lens region L, whereas the highest $n^{th}$ voltage Vmax is applied to the first electrode 101 located at the edge E of the lens region L. In this case, voltages applied to the first electrodes 101, located between the center O and the edge E of the lens region L, range from the threshold voltage Vmin to the $n^{th}$ voltage Vmax of the lens region L, and gradually increase with increasing distance from the center O of the lens region L. When voltages are applied to the plurality of first electrodes 101, a ground voltage is applied to the second electrode 201, generating a vertical electric field between the first electrodes 101 and the second electrode 201.

The plurality of first electrodes 101 are horizontally symmetrically formed about the edge E of the lens region L. The respective first electrodes 101 are connected to the corresponding voltage signal sources Vmin, V1, V2, . . . Vmax via voltage applying lines in pad regions (i.e. non-display regions of the display panel 350), whereby corresponding voltages are applied to the first electrodes 101.

The lowest threshold voltage Vmin, applied to the first electrode 101 formed at the center O of the lens region L, is an AC square wave voltage having a peak value of about 1.4V to 2V. The threshold voltage Vmin is given by $$V = \pi\sqrt{\frac{K1}{\Delta\varepsilon\varepsilon 0}}$$

(where, $\Delta\in$ is a liquid crystal dielectric constant anisotropy, K1 is the modulus of elasticity of liquid crystals, and $\in_c$ is a free-space dielectric constant). In addition, the highest voltage Vmax, applied to the first electrode 101 formed at the edge E of the lens region L, is an AC square wave voltage having a peak value of about 2.5V to 10V.

When voltages, ranging from the above-described threshold voltage (i.e. AC square wave voltage having a peak value of 1.4V to 2V) to the highest voltage (i.e. AC square wave voltage having a peak value of 2.5V to 10V), are applied to the plurality of first electrodes 101 provided in the electrically-driven liquid crystal lens 1000 and a ground voltage is applied to the second electrode 201, the electrically-driven liquid crystal lens 1000 functions similar to an optical parabolic lens, transmitting the first and second images IM1 and IM2 emitted from the display panel 350 to first and second viewing zones V1 and V2, respectively. If a distance between the first viewing zone V1 and the second viewing zone V2 is set to a distance between the viewer's eyes, the viewer combines the first and second images IM1 and IM2 transmitted to the first and second viewing zones V1 and V2, perceiving 3-dimensional images based on binocular disparity.

On the other hand, when no voltage is applied to the first electrodes 101 and second electrode 201, the electrically-driven liquid crystal lens 1000 simply serves as a transparent layer to directly display the first and second images IM1 and IM2 of the display panel 350 without refraction. Accordingly, the first and second images IM1 and IM2 are directly transmitted to the viewer regardless of viewing zones and thus, the viewer perceives 2-dimensional images.

In the drawing, one lens region L of the electrically-driven liquid crystal lens 1000 is configured to have the same width as a total width of two pixels P1 and P2 of the display panel 350 located below the electrically-driven liquid crystal lens 1000. As occasion demands, a plurality of pixels may correspond to one lens region L. In addition, the lens region L may be tilted at a predetermined angle with respect to the pixels and, as occasion demands, all the lens regions L may be arranged stepwise with respect to the pixels (more particularly, the lens region of an $n^{th}$ pixel horizontal line is shifted from an $(n+1)^{th}$ pixel horizontal line by a predetermined distance).

Each lens region L is defined to have a width equal to a pitch P, and the plurality of lens regions L with the same pitch are periodically repeated in a given direction (for example, in a horizontal direction as shown in FIG. 3). Here, "pitch P" means a horizontal width of a single lens region L. It is noted that the lens region L does not have a physical convex-lens shape, but achieves visual lens effects based on a difference in optical pathways caused when liquid crystals are aligned under the influence of an electric field.

In FIGS. 4 and 5, a distance between the center O and the edge E of the lens region L is equal to P/2. This means that symmetrical values of voltages are applied to the symmetrical first electrodes 101 from the edge E to the center O of the lens region L.

A first alignment film 102 and a second alignment film 202 are formed, respectively, on the first substrate 100 including the first electrodes 101 and on the second electrode 201. In this case, to allow the electrically-driven liquid crystal lens 1000 to function as a transparent layer in an initial state when no voltage is applied thereto, the first alignment film 102 has the same rubbing direction as the direction of the first electrodes 101, and the second alignment film 202 has a rubbing direction intersecting that of the first alignment film 102, or an anti-parallel rubbing direction. Thereby, the electrically-driven liquid crystal lens 1000 can directly pass images, transmitted from the display panel 350 located below thereof, to the viewer.

The above-described lens regions L exhibit a shape as shown in FIGS. 4 and 5 and are horizontally repeated at the intervals of the pitch P.

The plurality of first electrodes 101 has a bar shape extending along a crosswise direction of the first substrate 100 (in the direction into the drawing). Each of the first electrodes 101 has a width of 5 µm to 10 µm, and a distance between the neighboring first electrodes 101 is in a range from 5 µm to 10 µm. For example, the pitch P can be changed to various values ranging from 90 µm to 1,000 µm and, according to the above-described width and distance of the first electrodes 101, approximately ten to one hundred or more first electrodes can be formed on a per lens region basis.

Although not shown, in the electrically-driven liquid crystal lens 1000 according to the embodiment of the present invention, seal patterns (not shown) are formed at outer peripheral regions of the first and second substrates 100 and 200 (corresponding to non-display regions including pad regions of the display panel 350), to support the first and second substrates 100 and 200. The liquid crystal layer 300 between the first substrate 100 and the second substrate 200 must have a sufficient thickness equal to about 15 µm or more, in order to form a sufficient phase of the electrically-driven liquid crystal lens. To stably maintain the thickness of the liquid crystal layer 300, ball spacers or column spacers can be further provided to support a cell gap between the first substrate 100 and the second substrate 200. In this case, it is advantageous to position the spacers so as not to distort the phase of the electrically-driven liquid crystal lens.

FIG. 4 illustrates electric potential distribution of the above-described electrically-driven liquid crystal lens according to the present invention. In the simulation shown in FIG. 4, the thickness of the liquid crystal layer 300 is 20.000 µm, and liquid crystals of the liquid crystal layer 300 have positive dielectric constant anisotropy.

Specifically, the lowermost coordinate point 0.000 µM of a cell gap of the liquid crystal layer 300 can correspond to a surface of the first alignment film 102 on the first substrate 100, and the uppermost coordinate point 20.000 µm can correspond to a surface of the second alignment film 202 on the second substrate 200. As the first electrodes, all of which have the same width, are arranged on the same substrate and different voltages gradually decreasing from the edge to the center of the lens region are applied to the first electrodes, as shown in FIG. 4, a generally gentle vertical electric field is generated and also, a horizontal electric field is slightly generated between the neighboring first electrodes. In conclusion, a gentle horizontal electric field, which is strong at the edge E of the lens region L (the center of the drawing) and is weak at the center O of the lens region L, can be observed. As shown in FIG. 5 representing optical pathways of liquid crystals aligned at different positions according to an electric field, it can be appreciated that the electrically-driven liquid crystal lens is shaped similar to a gentle parabolic lens, in which the edge E of the lens region L represents the shortest optical pathway and the center O of the lens region L represents the longest optical pathway. In this case, the electrically-driven liquid crystal lens includes a plurality of finely split electrodes on a per lens region basis, and different voltages are applied to the respective electrodes to realize a fine waveform lens rather than a completely smooth parabolic lens, whereby a lens profile substantially similar to a parabolic lens plane can be accomplished.

In FIG. 4, the cell gap of the liquid crystal layer 300 is 20.000 µm. Provision of the above-described finely split first electrodes has the effect of lowering a sag of the electrically-driven liquid crystal lens (a highest point of the lens). This means that the thickness (cell gap) of the liquid crystal layer 300 of the electrically-driven liquid crystal lens can be reduced. Specifically, in the case of an electrically-driven liquid crystal lens in which a limited width of electrodes are formed only at the edge of the lens region on a lower substrate, a liquid crystal layer thereof must have a cell gap (thickness) of about 50.000 µm or more, in order to achieve the same sag as the simulation graph of FIG. 5. However, the present invention can reduce the thickness of the liquid crystal layer via gentle electric field distribution of the lens region.

In addition, in the case where a plurality of views is provided in one lens region via provision of the above-described finely patterned first electrodes 101, it can be appreciated that the electrically-driven liquid crystal lens of the present invention has advantages over a conventional electrically-driven liquid crystal lens. For example, in the conventional electrically-driven liquid crystal lens, the center of a lens region has no electrode of a lower substrate due to an increased pitch and therefore, has a difficulty to adjust alignment of liquid crystals because of a weak electric field. However, the electrically-driven liquid crystal lens of the present invention can easily adjust electric field intensity at a given position.

Figure 6:
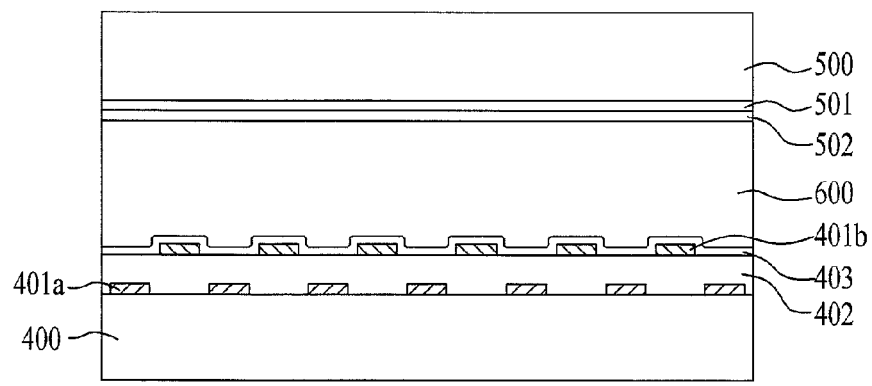
FIG. 6 is a sectional view illustrating an alternative configuration of the electrically-driven liquid crystal lens of FIG. 3.
Figure 7:
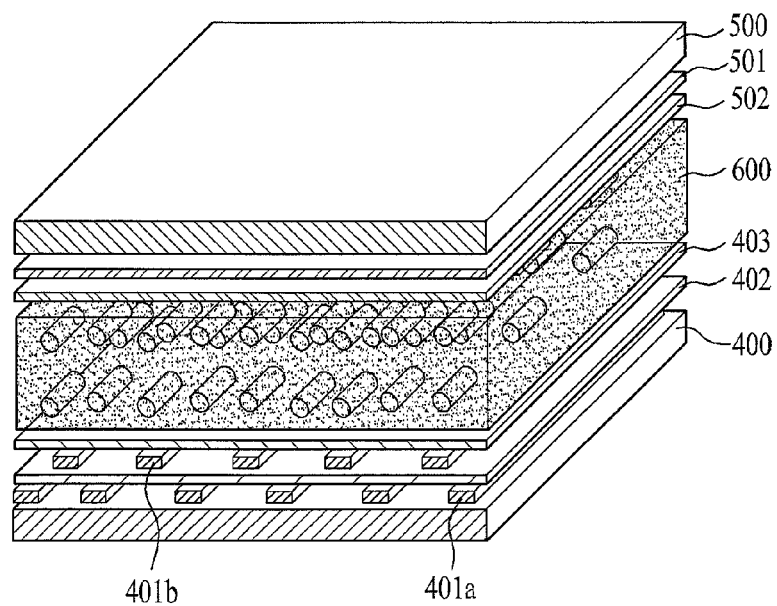
FIG. 7 is a perspective view illustrating the electrically-driven liquid crystal lens of FIG. 6.

FIG. 6 is a sectional view illustrating an alternative configuration of the electrically-driven liquid crystal lens of FIG. 3, and FIG. 7 is a perspective view illustrating the electrically-driven liquid crystal lens of FIG. 6.

As shown in FIGS. 6 and 7, in an alternative embodiment, the plurality of first electrodes may be divided into a plurality of layers. For example, when the plurality of first electrodes is patterned on a single plane, there is a limit to achieve a desired precise distance and width of the resulting pattern. To solve this problem, the first electrodes may be divided into two layers. In this case, the first electrodes formed on an upper one of the two layers can be located between the first electrodes formed on the lower layer.

More specifically, as shown in FIGS. 6 and 7, the electrically-driven liquid crystal lens according to the alternative embodiment of the present invention includes a plurality of first electrodes 401a and 401b formed on different layers. This alternative embodiment is applicable to situations that a large number of first electrodes are required for a lens region pitch and that it is difficult to arrange the first electrodes on a single layer with a desired spacing distance. To realize the alternative embodiment, a first insulating film 402 or a plurality of insulating films may be formed on a first substrate 400, to distribute the first electrodes 401a and 401b on the first substrate 400 and first insulating film 402, respectively. Here, the plurality of first electrodes 401a and 401b are formed on the first substrate 400 and first insulating film 402 such that they are horizontally symmetrical about the edge E of each lens region L.

Although not described, in the drawings, reference numeral 403 represents a first alignment film, reference numeral 500 represents a second substrate, and reference numerals 501 and 502 represent a second electrode and a second alignment film, respectively. Also, reference numeral 600 represents a liquid crystal layer. These constituent elements have the same functions as those of the above-described first embodiment, and a description thereof will be omitted.

With the above-described configuration as shown in FIGS. 6 and 7 in which the first electrodes 401a and 401b associated with the first substrate 400 of the electrically-driven liquid crystal lens are formed on the two layers, more dense and close arrangement of electrodes is possible, resulting in a lens profile more similar to a parabolic lens than the above-described profile shown in FIG. 5.

Hereinafter, a method for applying signals to the respective electrodes of the electrically-driven liquid crystal lens will be described.

Figure 8:
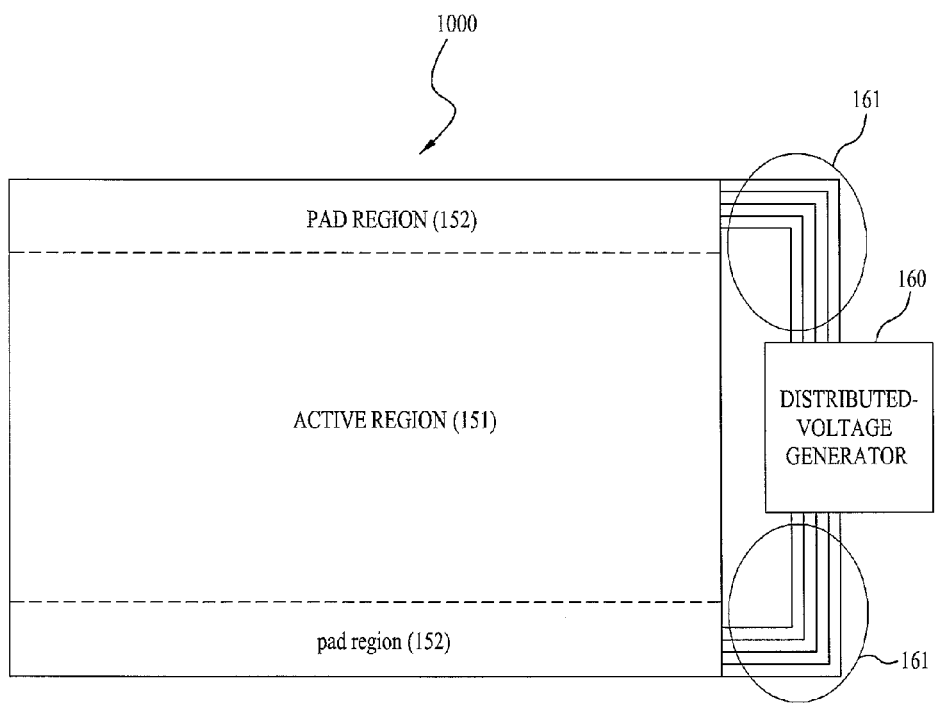
FIG. 8 is a plan view illustrating voltage application of an electrically-driven liquid crystal lens included in a stereoscopic display device according to the present invention.

FIG. 8 is a plan view illustrating voltage application of an electrically-driven liquid crystal lens included in a stereoscopic display device according to the present invention.

As shown in FIG. 8, the electrically-driven liquid crystal lens 1000 according to the present invention as described with reference to FIGS. 3, 6 and 7 includes an active region 151 as a display region, and pad regions 152 in which voltage signals are applied to the first electrodes 101 and the second electrode 201 arranged in the active region 151.

Each of the pad regions 152 contains a voltage source to apply voltage signals from an external station to the electrodes. The voltage source includes a distributed-voltage generator 160 (See FIG. 8) to supply distributed-voltages to the split electrodes, and links 161 to connect the distributed-voltage generator 160 and the pad region 152 to each other. Here, the voltage source applies different voltages to the plurality of first electrodes (101 in FIG. 3, or 401a and 401b in FIGS. 6 and 7) and also, applies a ground voltage to the second electrode (201 in FIG. 3 or 501 in FIGS. 6 and 7). To apply the different voltages to the plurality of first electrodes 101 or 401a and 401b, the distributed-voltage generator 160 of the voltage source includes resistors between voltage output terminals for minimum and maximum voltages and other different voltages therebetween, and buffers provided at the respective voltage output terminals. In this case, magnitudes of resistanceffs R1, . . . Rn−1, output between the respective voltage output terminals for minimum and maximum voltages and other different voltages therebetween, can be adjusted according to magnitudes of the distributed-voltages. The voltages, applied to the respective first electrodes 101 or 401a and 401b, gradually increases from the edge E to the center O of the lens region L. These voltages can be also adjusted according to the magnitudes of resistances.

Here, either end of each first electrode 101, 401a or 401b comes into contact with metal lines formed in the pad region, to which any one of a total of n voltage signals from the first voltage Vmin to the $n^{th}$ voltage Vmax is applied.

Figure 9:
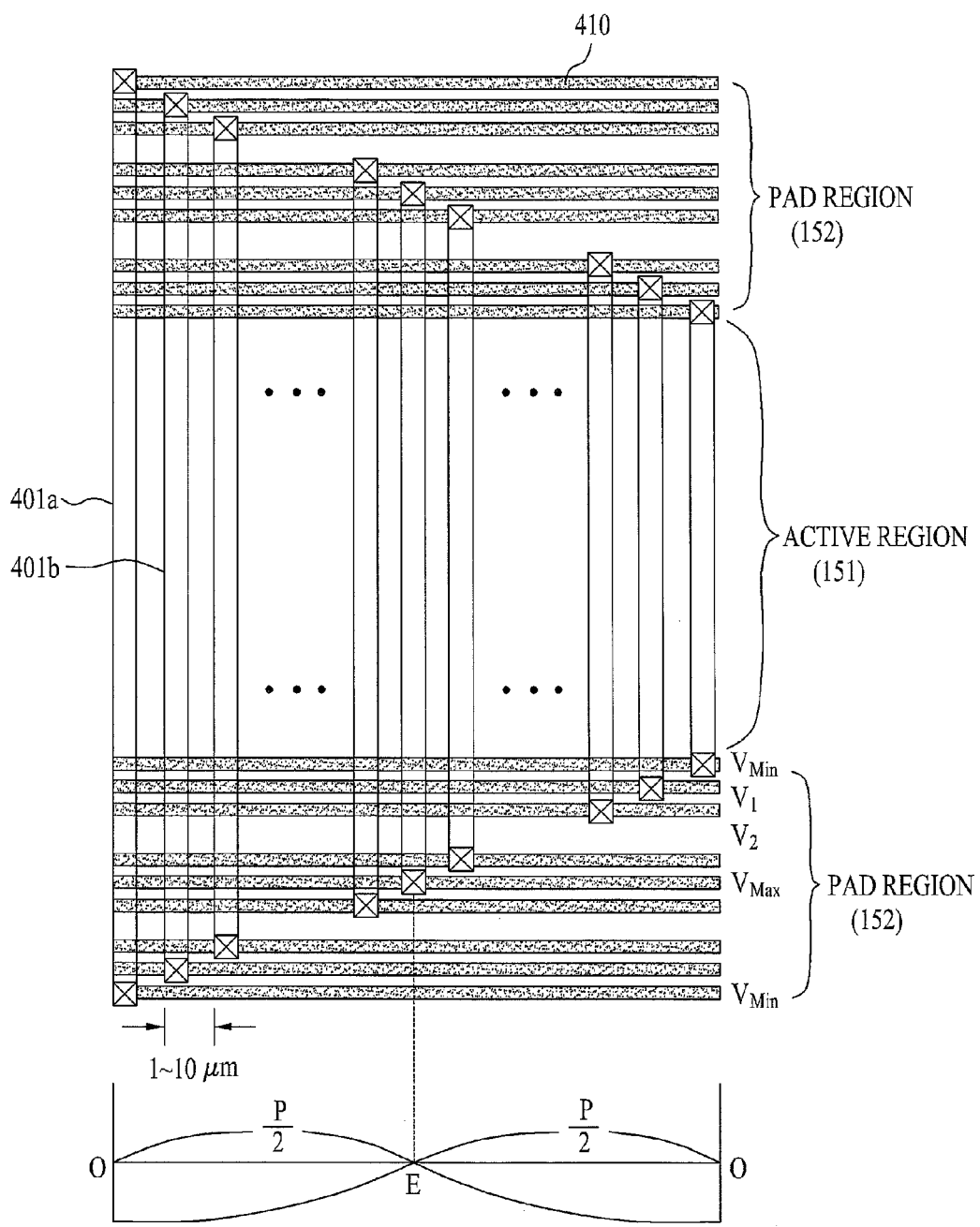
FIG. 9 is a plan view illustrating a connection relationship between signal lines and electrodes of the electrically-driven liquid crystal lens according to the present invention.

FIG. 9 is a plan view illustrating a connection relationship between signal lines and electrodes of the electrically-driven liquid crystal lens according to the present invention.

Figure 1:
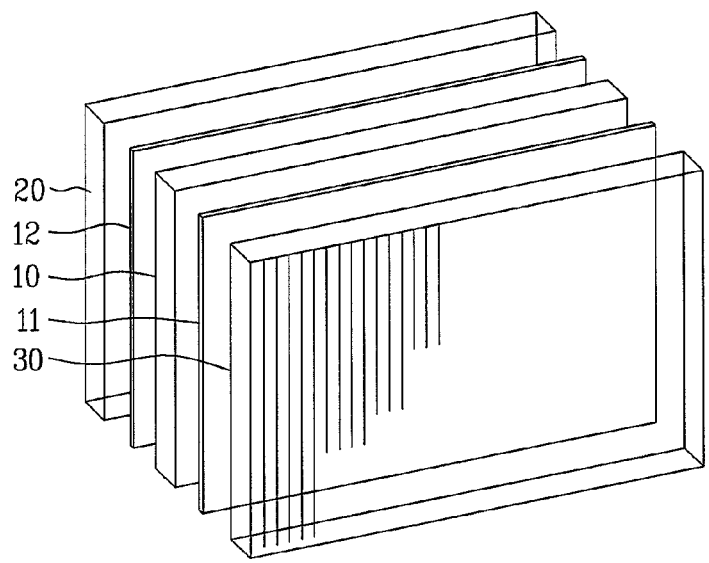
FIG. 1 is a perspective view illustrating a conventional lenticular lens type stereoscopic display device.
Figure 2:
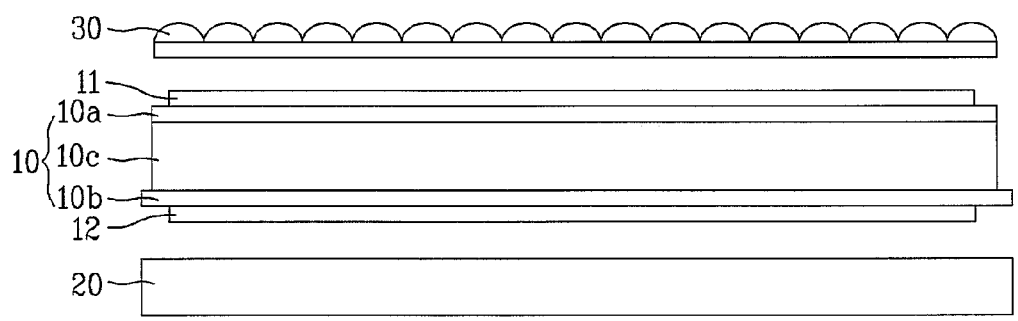
FIG. 2 is a sectional view of FIG. 1.

In FIG. 9, the first electrodes 401a and 401b are arranged in two layers as shown in FIGS. 6 and 7, and 2n−1 metal lines 410 are formed in each of the pad regions 152 above and below the active region 151. More specifically, with respect to a total of n metal lines 410 between the edge E of the lens region L (the center of the drawing) and the center O of the lens region L (the left side of the drawing), voltages ranging from the first voltage Vmin to the $n^{th}$ voltage Vmax are applied starting from the lowermost metal line 410 to the $n^{th}$ metal line 410. Also, with respect to a total of n metal lines 410 between the center O of the lens region L (the right side of the drawing) and the edge E of the lens region L (the center of the drawing), voltages ranging from the first voltage Vmin to the $n^{th}$ voltage Vmax are sequentially applied starting from the uppermost metal line 410. In this case, on the basis of the edge E of the lens region L, more particularly, on the basis of the first electrode 401a or 401b corresponding to the edge E and the metal line 410 in contact with the first electrode 401a or 401b, symmetrical voltage signals decreasing from the $n^{th}$ voltage Vmax to the first voltage Vmin are applied to the upper and lower metal lines 410. The respective first electrodes 401a and 401b are sequentially brought into contact with the metal lines 410, such that voltages gradually decreasing from the edge E to the center O of the lens region L are applied to the first electrodes 401a and 401b. In this case, the first electrodes 401a and 401b and the metal lines 410 are brought into contact with each other via contact holes formed in a passivation layer (not shown) therebetween.

Here, the plurality of first electrodes 401a and 401b are arranged within the lens region L with the same width and the same distance, and are formed in different layers on the first substrate 400. FIGS. 6 and 7 illustrate a state wherein the first electrodes 401a and 401b are formed on a surface of the first substrate 400 and on the insulating film 402.

In other repeated lens regions identical to the shown lens region, the respective first electrodes 401a and 401b are brought into contact with the shown metal lines 410 in the same manner. Specifically, with respect to a single metal line 410, the first electrodes 401a and 401b have the same number of contacts as the number of lens regions defined on the first substrate 400.

With relation to the second electrode 501 formed over the entire surface of the second substrate 500, the second electrode 501 may be brought into contact with one of the first electrodes 401a and 401b formed below thereof, to which the lowermost voltage Vmin is applied, to thereby receive the lowermost voltage Vmin, or may receive the voltage Vmin via a connector connected to a separate voltage source.

FIG. 10 is a plan view illustrating another embodiment of connection relationship between signal lines and electrodes of the electrically-driven liquid crystal lens according to the present invention.

In FIG. 10 illustrating another embodiment of the electrically-driven liquid crystal lens in plan view, in lieu of using symmetrical upper and lower pad regions as shown in FIG. 9, a single pad region including n metal lines 420 is provided only above the active region, to minimize formation locations and contacts of the metal lines 410 and consequently, to increase an active region. In this case, a total of n voltage signals from the first voltage Vmin to the $n^{th}$ voltage Vmax are applied to the n metal lines 420, respectively, and a total of (2n−1) first electrodes 401a and 401b are provided between opposite edges of a single lens region (the edge of the lens region corresponds to the center of the drawing and the center of the lens region corresponds to the left side or right side of the drawing). Except for the metal line 420 to which the $n^{th}$ voltage Vmax is applied, each of the remaining metal lines 420, to which voltage signals from the first voltage Vmin to the n−$1^{th}$ voltage Vmax−1 are applied, has two horizontally symmetrical contacts with the respective first electrodes 401a and 401b.

The above-described configuration except for the single pad region is identical to the above-described configuration of FIG. 9 and thus, a description of the same configuration will be omitted.

Alternatively, in consideration of line resistance of the first electrodes 401a and 401b, the metal lines 420 may be additionally formed below the active region as well as above the active region to achieve a vertically symmetrical shape. Symmetrically to the illustration, lower contacts may be provided between the first electrodes 401a and 401b and the metal lines 420 of the pad region below the active region.

Hereinafter, a method for forming contacts between the first electrodes and the metal lines in the above-described pad regions will be described.

Figure 11A:
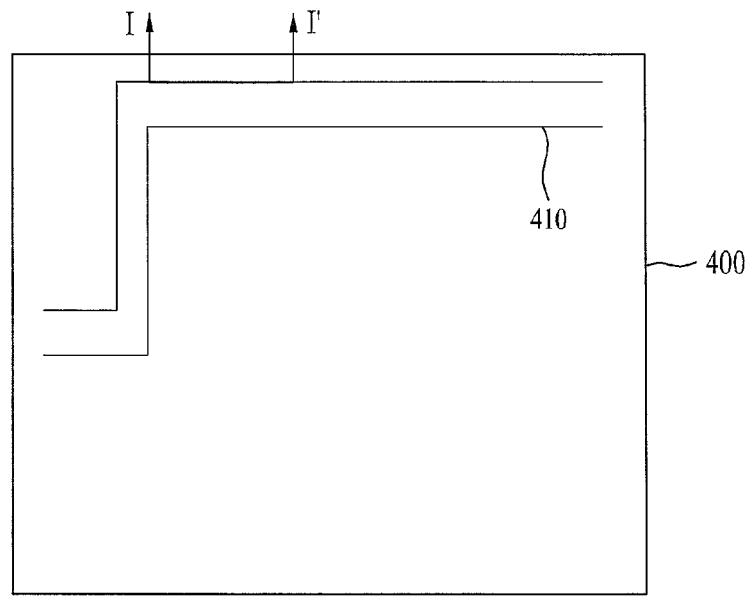
FIGS. 11A to 11E are process plan views illustrating a method for forming electrodes and metal lines in an electrically-driven liquid crystal lens according to a first embodiment of the present invention.
Figure 11B:
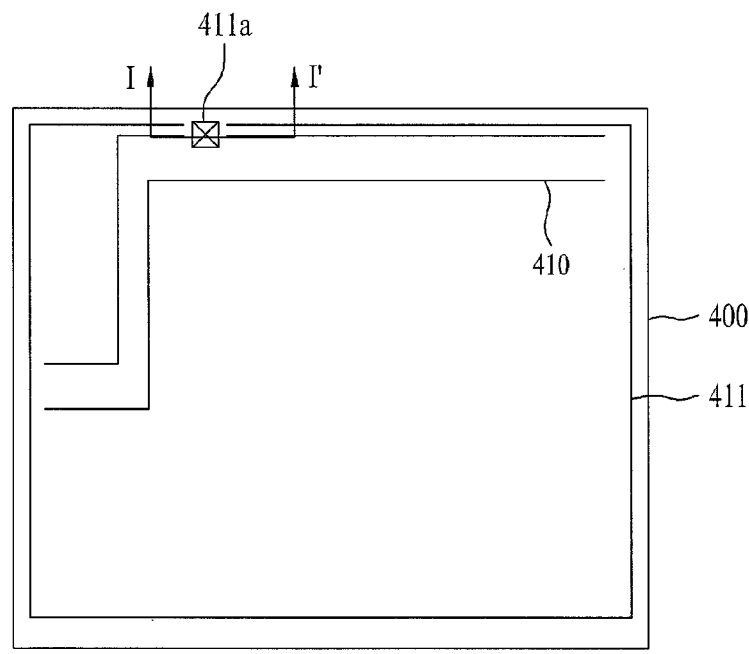
Figure 11C:
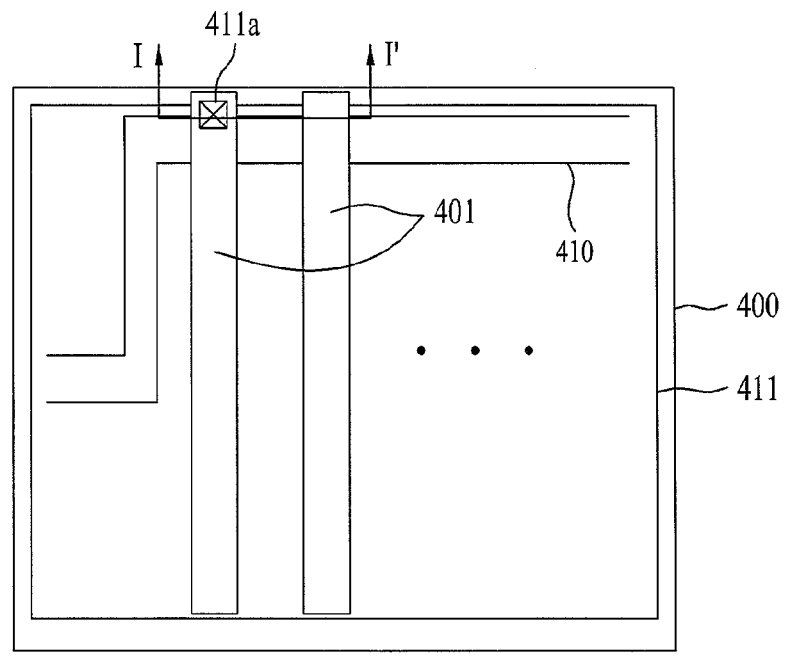
Figure 11D:
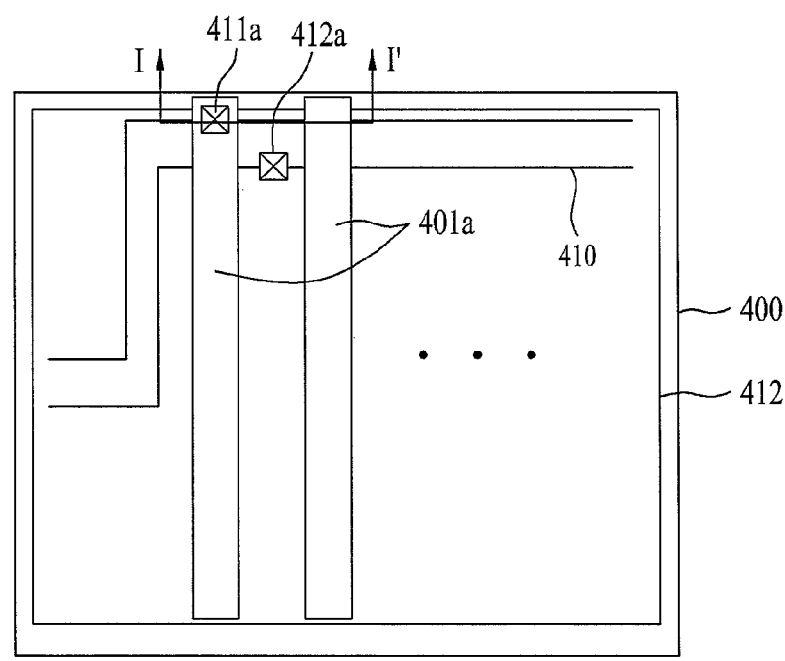
Figure 11E:
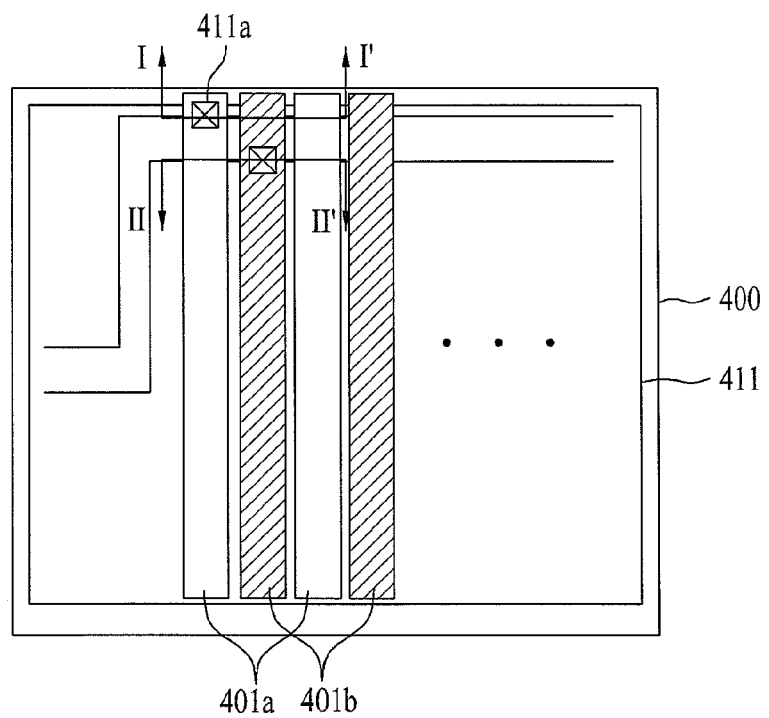
Figure 12A:
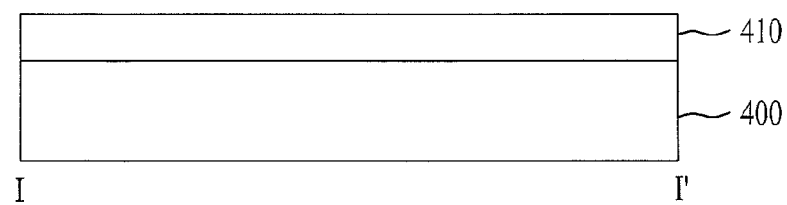
FIGS. 12A to 12D are sequential process sectional views taken along the line I-I' of FIG. 11A.
Figure 12B:
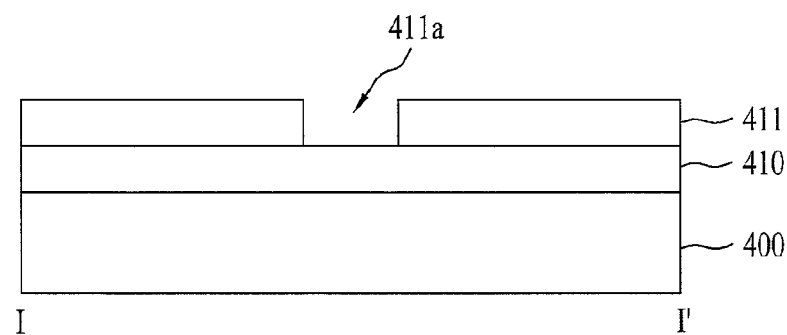
Figure 12C:
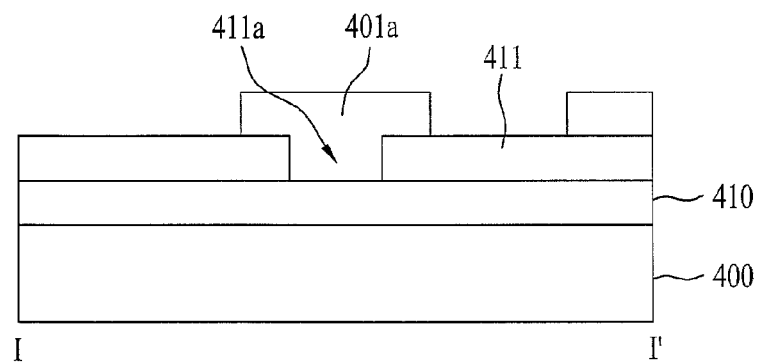
Figure 12D:
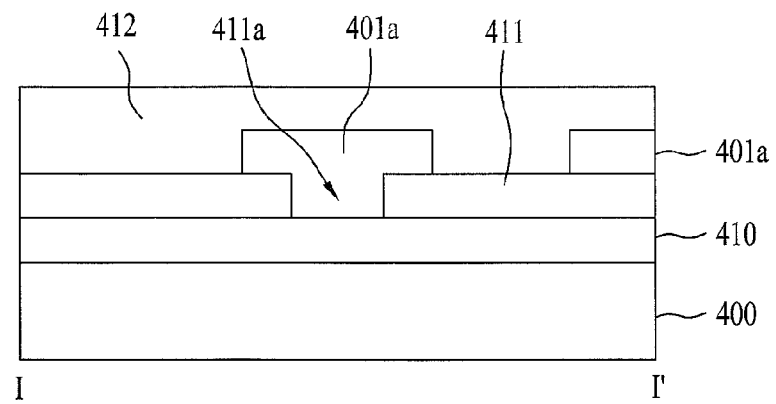
Figure 13A:
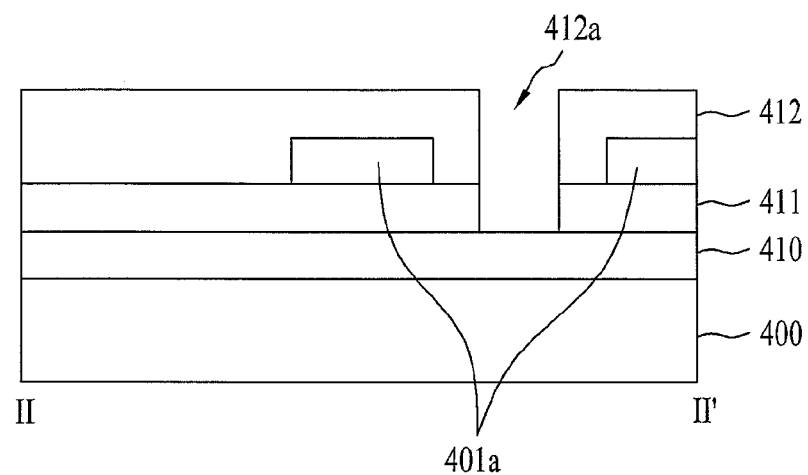
FIGS. 13A and 13B are sequential process sectional views taken along the line II-II' of FIG. 11E.
Figure 13B:
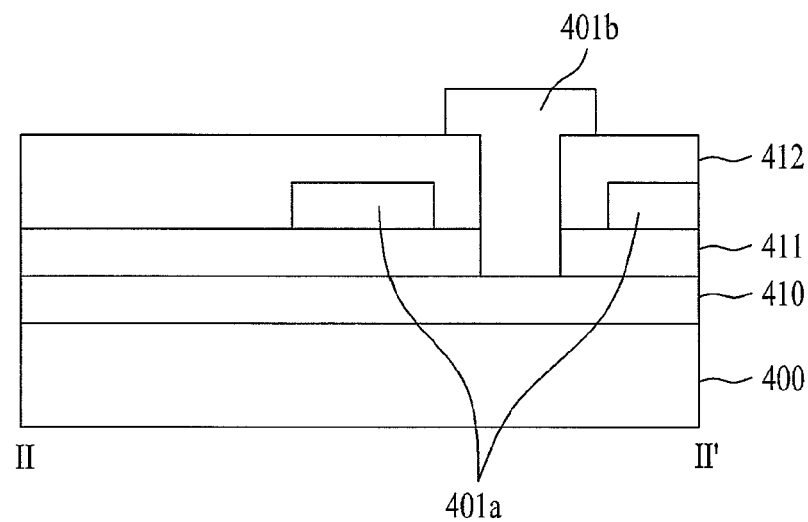

FIGS. 11A to 11E are process plan views illustrating a method for forming electrodes and signal lines (metal lines) according to a first embodiment of the present invention, FIGS. 12A to 12D are sequential process sectional views taken along the line I-I' of FIG. 11A, and FIGS. 13A and 13B are sequential process sectional views taken along the line II-II' of FIG. 11E.

To form electrodes and signal lines according to the first embodiment of the present invention, first, as shown in FIGS. 11A and 12A, after depositing metal on the first substrate 400, the deposited metal is selectively removed, forming metal lines 410. Here, the metal lines 410 take the form of lines, and one end of each metal line 410 (the left side of the drawing) is connected to an exterior voltage source (not shown) via an FPC (not shown) or connector. The metal line 410 may be bent near the end thereof such that the bent portion of the metal line 410 extends above and below the original portion of the metal line 410 parallel to an upper or lower edge of the original portion.

The metal lines 410 are adapted to receive voltage signals from the exterior voltage source, and the number of the metal lines 410 is associated with the number of first electrodes formed in one lens region defined on the first substrate 400. For example, in the configuration of FIG. 9, if a total of 2n−1 first electrodes are formed in the lens region, 2n−1 metal lines 410 are formed. The minimum voltage (the first voltage Vmin) is applied to the metal line corresponding to the center of the lens region, and the maximum voltage (the $n^{th}$ voltage Vmax) is applied to the metal line corresponding to the edge of the lens region. In addition, different voltages ranging from the minimum voltage to the maximum voltage are applied to the remaining metal lines corresponding to electrodes between the edge and the center of the lens region. Here, the same voltage, in the range of Vmin to Vmax−1, is applied to the symmetrical metal lines above and below the metal line corresponding to the edge of the lens region (to which the maximum voltage Vmax is applied).

Next, as shown in FIGS. 11B and 12B, a first insulating film 411 is formed over the entire surface of the first substrate 400 including the metal lines 410. The first insulating film 411 is selectively removed, forming first contact holes 411a containing contacts for first electrodes of a first layer.

Next, as shown in FIGS. 11C and 12C, the first contact holes 411a are buried as a transparent electrode is deposited on the first insulating film 411. As the deposited transparent electrode is selectively removed, first electrodes 401a of the first layer are formed to intersect the metal lines 410. The first electrodes 401a come into contact with the metal lines 410 via the first contact holes 411a. The number of the metal lines 410 is equal to the number of the first electrodes 401a of the first layer formed in each lens region. The drawings illustrate a state wherein the first electrodes 401a of the first layer in a single lens region comes into contact with the metal lines 410. As will be appreciated, even the other lens regions may have contacts between the metal lines 410 and the first electrodes 401a as shown.

Next, as shown in FIGS. 11D and 12D, a second insulating film 412 is formed over the entire surface of the first insulating film 411 including the first electrodes 401a of the first layer. Subsequently, as shown in FIG. 13A, the second insulating film 412 and first insulating film 411 are selectively removed, forming second contact holes 412a. The second contact holes 412a are formed so as not to overlap with the first contact holes, and serve to expose the metal lines 410 to the outside.

Next, as shown in FIGS. 11E and 13B, the second contact holes 412a are buried as a transparent electrode is deposited over the entire surface of the second insulating film 412. As the deposited transparent electrode is selectively removed, first electrodes 401b of a second layer are formed to intersect the metal lines 410 while coming into contact with the metal lines 410 via the second contact holes 412a.

Although two metal lines 410 are shown in the drawing, even when a plurality of metal lines 410, such as n metal lines or 2n−1 metal lines, is formed, the formation of contacts can be accomplished in the same manner as the illustration. Assuming that the plurality of metal lines 410 is provided, the first electrodes 401a of the first layer and the first electrodes 401b of the second layer are alternately brought into contact with the metal lines 410.

The above-described formation of electrodes and metal lines according to the first embodiment of the present invention requires a total of five masks for formation of the metal lines, formation of the first contact holes, formation of the first electrodes of the first layer, formation of the second contact holes, and formation of the first electrodes of the second layer. However, the use of each mask entails exposure and developing processes for patterning of a photosensitive layer, and aligning between the respective masks is difficult. Therefore, the increased number of masks causes deterioration in production yield. For this reason, efforts to reduce the number of masks have been proposed.

Hereinafter, a method for forming contacts between electrodes and metal lines using a reduced number of masks according to a second embodiment will be described.

Figure 14A:
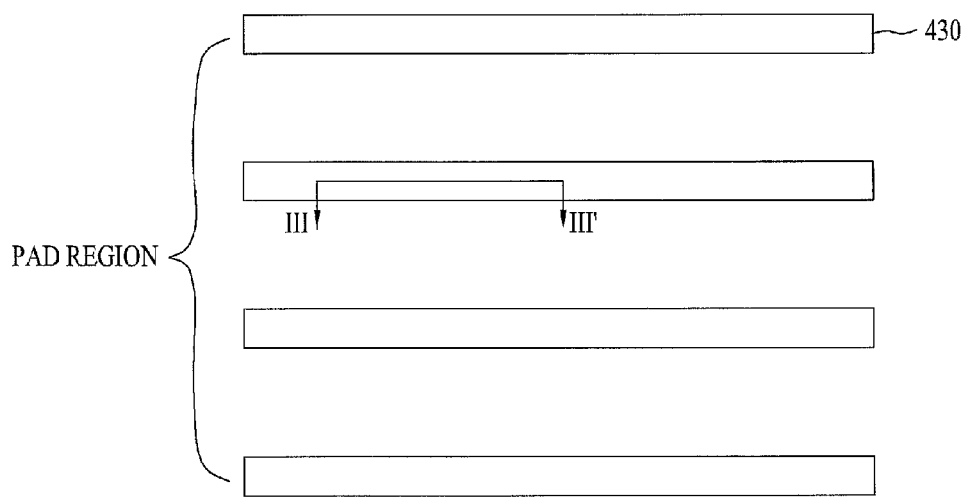
FIGS. 14A to 14D are process sectional views illustrating a method for forming electrodes and metal lines in an electrically-driven liquid crystal lens according to a second embodiment of the present invention.
Figure 14B:
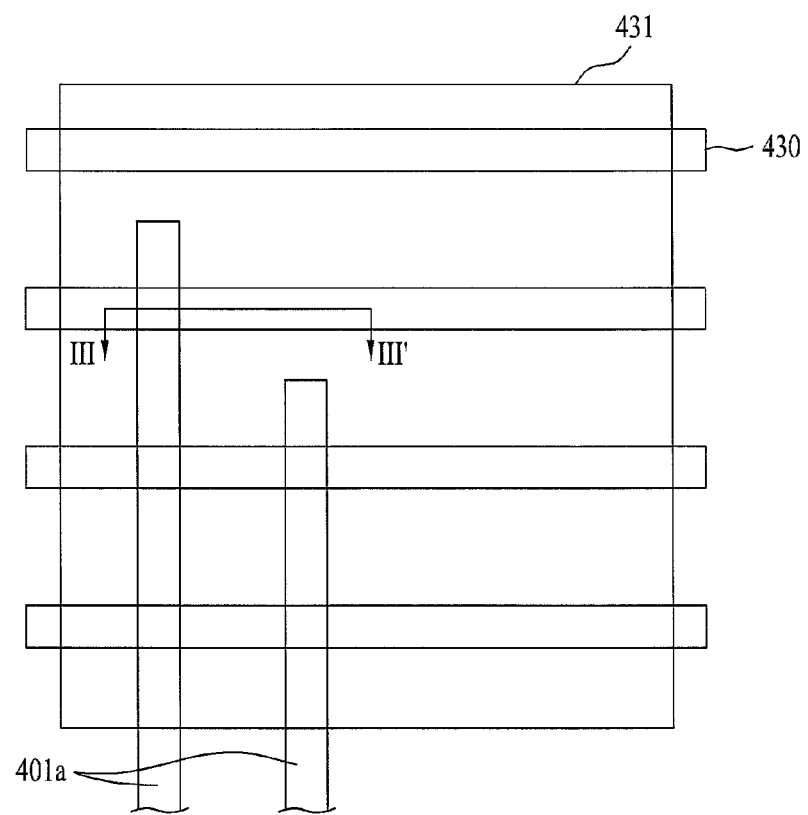
Figure 14C:
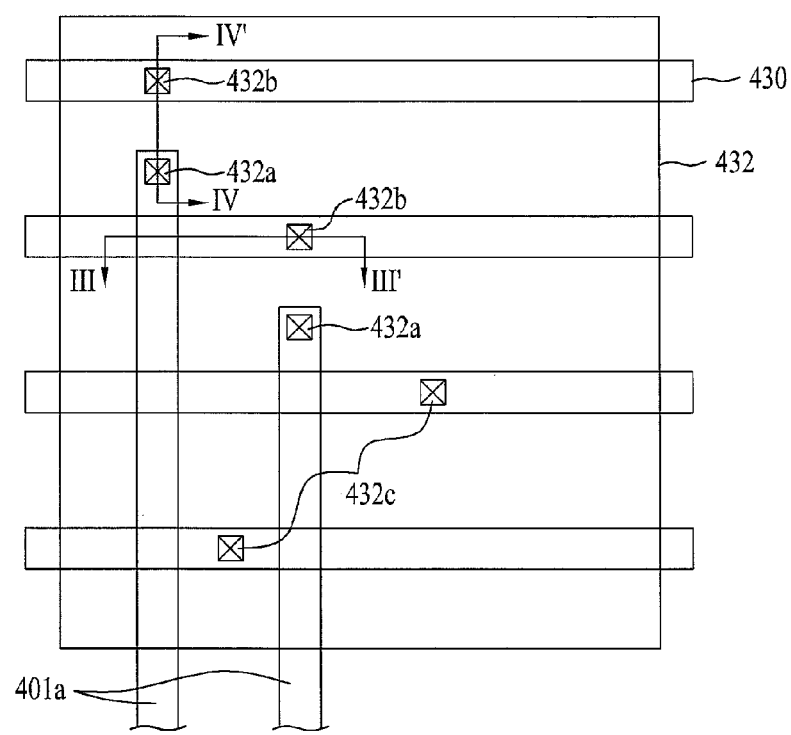
Figure 14D:
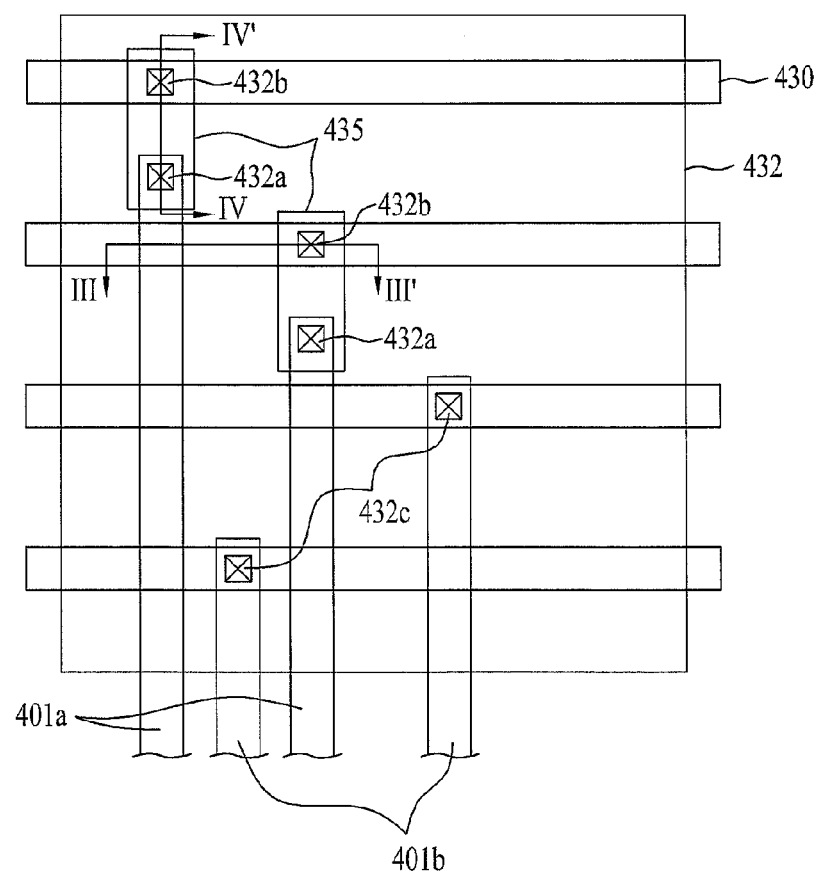
Figure 15A:
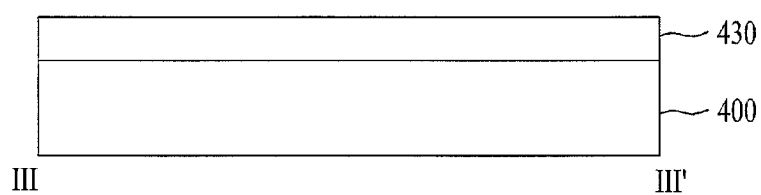
FIGS. 15A to 15D are sequential process sectional views taken along the line III-III' of FIG. 14C.
Figure 15B:
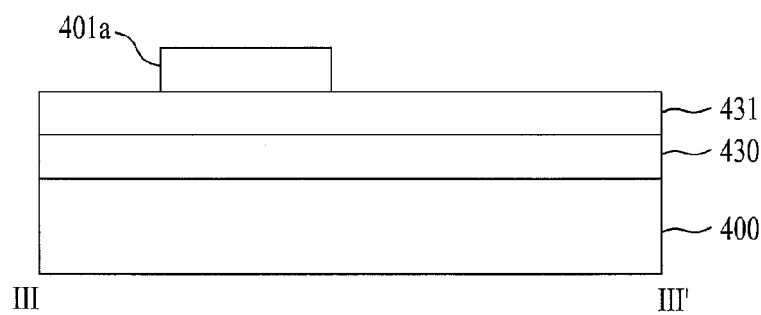
Figure 15C:
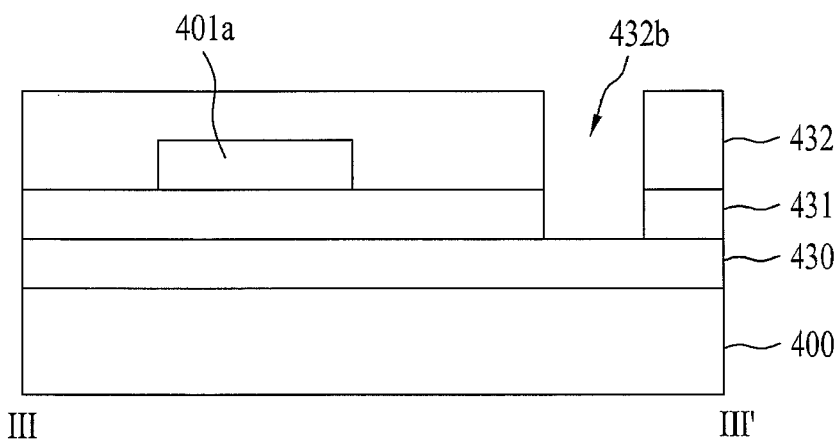
Figure 15D:
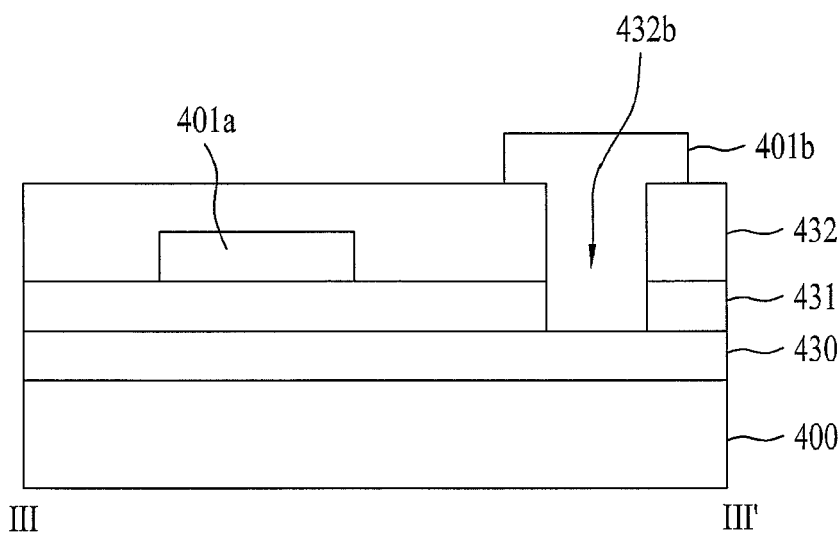
Figure 16A:
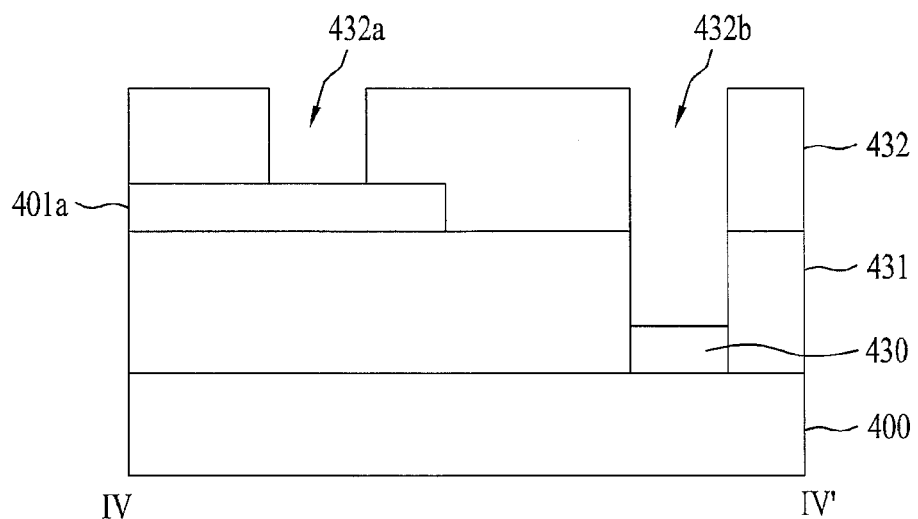
FIGS. 16A and 16B are sequential process sectional views taken along the line IV-IV' of FIG. 14C.
Figure 16B:
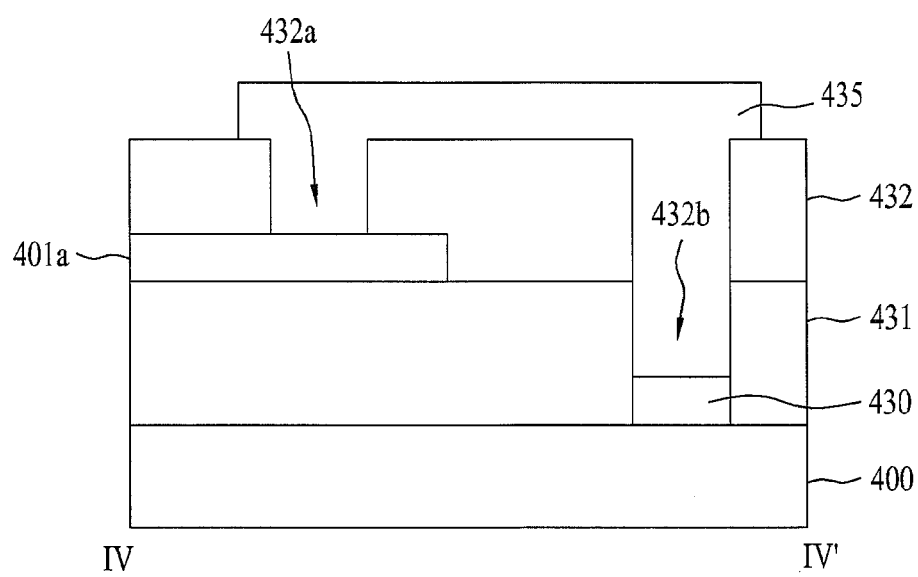

FIGS. 14A to 14D are process sectional views illustrating a method for forming electrodes and metal lines according to a second embodiment of the present invention, FIGS. 15A to 15D are sequential process sectional views taken along the line III-III' of FIG. 14C, and FIGS. 16A and 16B are sequential process sectional views taken along the line IV-IV' of FIG. 14C.

In the drawings, of pad regions on a first substrate, only a particular pad region, located at the upper side or lower side of a first substrate in which contacts between electrodes and metal lines are formed, is illustrated.

To form electrodes and signal lines according to the second embodiment of the present invention, first, as shown in FIGS. 14A and 15A, after depositing metal on the first substrate 400, the deposited metal is selectively removed, forming metal lines 430. Here, the metal lines 430 take the form of lines, and are spaced apart from one another by a constant distance. Although not shown, as can be appreciated with reference to FIG. 11A, in the entire first substrate 400, one end of each metal line (the left side of the drawing) is connected to an exterior voltage source (not shown) via an FPC (not shown) or connector. The metal line 410 is bent near the end thereof such that the bent portion of the metal line 410 extends above and below the original portion of the metal line 410 parallel to an upper or lower edge of the original portion.

The metal lines 430 are adapted to receive voltage signals from the exterior voltage source, and the number of the metal lines 430 is associated with the number of first electrodes formed in one lens region defined on the first substrate 400. For example, in the configuration of FIG. 9, if a total of 2n−1 first electrodes are formed in the lens region, 2n−1 metal lines 410 are formed. The minimum voltage (the first voltage Vmin) is applied to the metal line corresponding to the center of the lens region, and the maximum voltage (the $n^{th}$ voltage Vmax) is applied to the metal line corresponding to the edge of the lens region. In addition, different voltages ranging from the minimum voltage to the maximum voltage are applied to the remaining metal lines corresponding to electrodes between the edge and the center of the lens region. Here, the same voltage, in a range from Vmin to Vmax−1 is applied to the symmetrical metal lines above and below the metal line corresponding to the edge (to which the maximum voltage Vmax is applied).

Next, as shown in FIGS. 14B and 15B, a first insulating film 431 is formed over the entire surface of the first substrate 400 including the metal lines 430.

Subsequently, first electrodes 401a of a first layer are formed on the first insulating film 431, to intersect the metal lines 430.

Next, as shown in FIGS. 14C, 15C and 16A, after forming a second insulating film 432 over the entire surface of the first insulating film 431 including the first electrodes 401a, the second insulating film 432 is selectively removed, forming first contact holes 432a to expose some of the respective first electrodes 401a of the first layer. Simultaneously, the second insulating film 432 and first insulating film 431 are selectively removed, forming second contact holes 432b and third contact holes 432c to expose desired portions of the respective metal lines 430.

Next, as shown in FIGS. 14D, 15D and 16B, the first to third contact holes 432a, 432b and 432c are buried as a transparent electrode is deposited over the entire surface of the second insulating film 432. As the deposited transparent electrode is selectively removed, first electrodes 401b of a second layer are formed between the first electrodes 401a of the first layer, to intersect the metal lines 430 while coming into contact with some of the metal lines 430 that are exposed via the third contact holes 432c. Simultaneously, a transparent electrode pattern 435 is formed to pass above the first contact holes 432a so as to intersect the metal lines 430 while coming into contact with some of the metal lines 430 that are exposed via the second contact holes 432b.

Here, the second contact holes 432b and first contact holes 432a are connected to each other via the transparent electrode pattern 435, and the third contact holes 432c are connected to the first electrodes 401b of the second layer. In conclusion, the metal lines 430, transparent electrode pattern 435 and first electrodes 401a of the first layer are connected to one another, allowing signals to be applied to the first electrodes 401a of the first layer. Also, the metal lines 430 are connected to the first electrodes 401b of the second layer, thereby applying signals to the first electrodes 401b of the second layer.

The above-described method of the second embodiment requires four masks for formation of the metal lines, formation of the first electrodes of the first layer, formation of a plurality of contact holes, and formation of the first electrodes of the second layer. That is, the present embodiment achieves a reduction in the number of masks and consequently, eliminates the corresponding exposure and developing processes. This results in an improvement in production yield and a reduction in various costs.

Although four metal lines 430 are shown in the drawing, even if a plurality of metal lines 430, such as n metal lines or 2n−1 metal lines, is formed, the formation of contacts can be accomplished in the same manner as the illustration. Assuming that the plurality of metal lines 430 is provided, the first electrodes 401a of the first layer and the first electrodes 401b of the second layer are alternately brought into contact with the metal lines 430.

Figure 17:
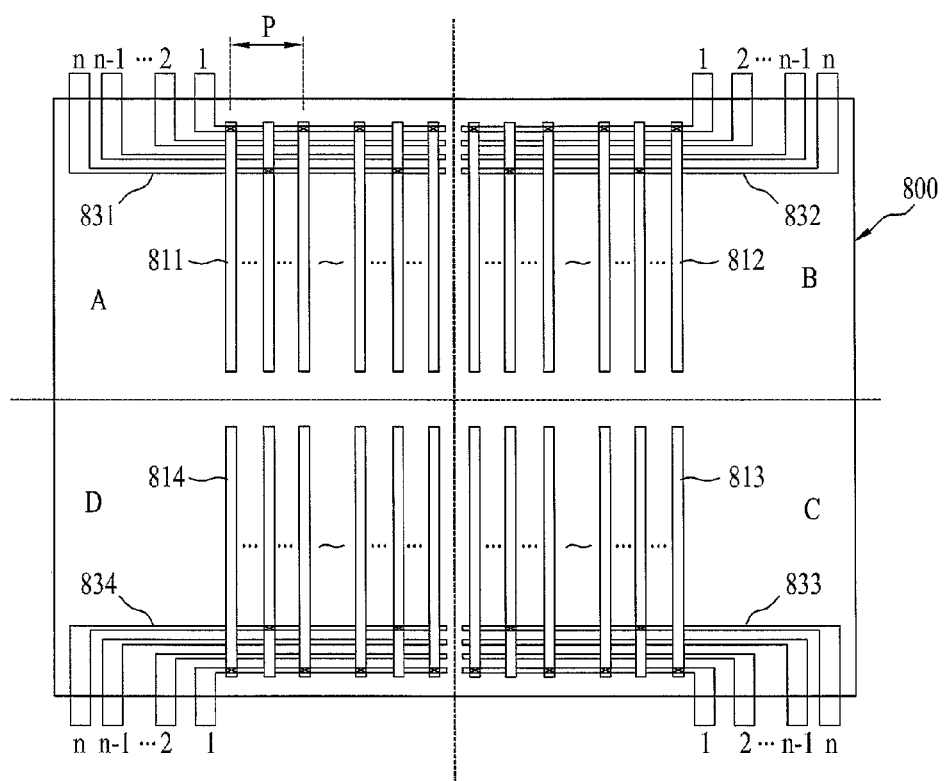
FIG. 17 is a plan view illustrating an electrically-driven liquid crystal lens according to a third embodiment of the present invention.

FIG. 17 is a plan view illustrating an electrically-driven liquid crystal lens according to a third embodiment of the present invention.

As shown in FIG. 17, in consideration of the fact that the longer the length of first electrodes or metal lines, the greater the line resistance, the electrically-driven liquid crystal lens according to the third embodiment of the present invention proposes to prevent a location away from a signal applying location from receiving an incorrect voltage, causing deterioration in reliability.

For this, in the third embodiment, a first substrate 800 is divided into a plurality of sections A, B, C and D, and the sections A, B, C and D are provided with first electrodes 811, 812, 813 and 814, respectively and also, are provided with metal lines 831, 832, 833 and 834 to be brought into contact with the respective first electrodes 811, 812, 813 and 814, respectively.

In the above-described configuration, assuming that n voltages are applied to the metal lines 831, 832, 833 and 834, if the respective sections A, B, C and D have the same number and range of voltages applied thereto, it is contemplated that n voltages generated from the exterior voltage source can be distributed and applied to the metal lines 831, 832, 833 and 834 of the respective sections. As occasion demands, different numbers and ranges of voltages may be applied on a per section basis, and this enables selective driving on a per section basis.

In FIG. 17, for example, with relation to the first section A, assuming that one lens region has a width P, symmetrical voltages are applied to the lens region on the basis of the center of the lens region. Specifically, the minimum voltage is applied to the center of the lens region, and the maximum voltage is applied to the edge of the lens region.

Here, a second substrate (not shown) opposite the first substrate 800, as shown in FIG. 7, is provided with a second electrode as a common electrode formed over the entire surface of the second substrate.

In addition, the electrically-driven liquid crystal lens according to the third embodiment is configured such that a vertical electric field, generated between the first electrodes 811, 812, 813 and 814 in the form of finely split electrodes and the second electrode (not shown), causes a difference in effective refraction index of liquid crystals for creating an electrically-driven liquid crystal lens. A voltage application method follows the above-described method except for the fact that voltages are distributed and differentiated on a per section basis.

A lower substrate is provided with transparent Indium Tin Oxide (ITO) electrodes, and an upper substrate is provided, throughout a surface thereof, with a single transparent ITO electrode. If the ITO electrodes of the lower substrate are formed as multi-split electrodes as shown, and different voltages are applied to the electrodes to generate a vertical electric field between the upper substrate and the lower substrate, the shown region undergoes a change in effective refraction index of liquid crystals, serving as a lens.

The electrically-driven liquid crystal lens according to the third embodiment of the present invention is devised in consideration of the fact that, assuming that long first electrodes extend throughout a given direction of a first substrate without division of sections, if some of the first electrodes contain conductive residues, the residues take the form of lines and thus, are vulnerable. Also, line resistance of electrodes or metal lines causes a voltage dropping with increasing distance from a voltage applying location. Adoption of the above-described divided configuration on a per section basis can solve an extended routing of metal lines or first electrodes. Also, even if some of the first electrodes exhibit the routing, the remaining portions can be normally driven, minimizing the effect of defects.

Another advantage is a reduction in the number of contacts with a single metal line in direct proportion to the number of divided sections. For example, if there are four divided sections as shown, the number of contacts with a single metal line can be reduced to $\frac{1}{4}^{th}$. Consequently, it is possible to prevent a resistance increase during a contact forming process or short-circuit between electrodes. In particular, with relation to a large-area electrically-driven liquid crystal lens, the above-described third embodiment can achieve more uniform line resistance and stable voltage application.

In FIG. 17, a black matrix layer (not shown) may be positioned so as not to be visually perceived in a zone, not formed with the first electrodes 811, 812, 813 and 814, in the vicinity of a horizontal dotted line that divides the sections A and B from the sections C and D. Also, at the boundaries of the respective adjacent sections, the first electrodes 811, 812, 813 and 814 are arranged by a distance suitable to prevent short-circuit thereof. Alternatively, the first electrodes 811, 812, 813 and 814 may be arranged atypically rather than the illustrated line shape, so as not to be visually perceived. For example, with respect to the adjacent sections A and D, some of the first electrodes 811 in the section A are long and the others are short, whereas the first electrodes 814 of the section D have the opposite configuration, whereby the first electrodes 811 and 814 of the sections A and D have an alternating arrangement, preventing a line shaped non-lens region from being perceived.

The above-described second and third embodiments are applicable together to a liquid crystal display device. For example, a first substrate having divided sections as described in the third embodiment may be prepared and signal lines and first electrodes divided on a per section basis may be formed using four masks as described in the second embodiment.

Meanwhile, a stereoscopic display device according to the present invention may include a display panel serving to emit 2-dimensional image signals, and the above-described electrically-driven liquid crystal lens, as described in the above several embodiments, serving to directly emit 2-dimensional image signals transmitted from the display panel or to convert the 2-dimensional image signals into 3-dimensional image signals.

In a method for driving the stereoscopic display device, when it is desired to allow the electrically-driven liquid crystal lens to emit 2-dimensional image signals, the first and second electrodes may be floated or a zero voltage 0V may be applied to the first and second electrodes. On the other hand, when it is desired to display 3-dimensional image signals, a positive voltage is applied to the first electrodes and a ground voltage is applied to the second electrode (common electrode), causing the liquid crystal layer to be driven toward the lens regions of the electrically-driven liquid crystal lens. Thereby, converted 3-dimensional image signals from the display panel can be emitted.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, an electrically-driven liquid crystal lens and a stereoscopic display device using the same according to the present invention have the following effects.

Firstly, according to the present invention, first electrodes can be arranged into a plurality of layers. In this case, in lieu of forming contacts between the first electrodes of each layer and metal lines, the first electrodes of the uppermost layer are brought into contact with the metal lines by use of contact holes and a desired pattern connected to the contact holes. This has the effect of reducing the number of masks required to form contact holes. For example, when the first electrodes are formed into two layers, four masks are required for formation of metal lines, formation of first electrodes of a first layer, formation of a plurality of contact holes and formation of first electrodes of a second layer, achieving a minimal number of masks used and consequently, eliminating the corresponding exposure and developing processes. This results in an improvement in production yield and a reduction in various costs.

Secondly, the present invention is devised in consideration of the fact that, assuming that long first electrodes extend throughout a given direction of a first substrate without division of sections and some of the first electrodes contain conductive residues, the residues take the form of lines and thus, are vulnerable. Also, line resistance of electrodes or metal lines causes a voltage drop with increasing distance from a voltage applying location. Adoption of the divided configuration on a per section basis according to the present invention can solve an extended routing of metal lines or first electrodes. Also, even if some of the first electrodes exhibit the routing, the remaining portions can be normally driven, minimizing the effect of defects.

Thirdly, according to the present invention, the number of contacts associated with a single metal line can be reduced in direct proportion to the number of divided sections. For example, if there are four divided sections, the number of contacts between a single metal line and the first electrodes can be reduced to $\frac{1}{4}^{th}$. Consequently, it is possible to prevent a resistance increase during a contact forming process or short-circuit between electrodes. In particular, with relation to a large-area electrically-driven liquid crystal lens, the above-described third embodiment can achieve a more uniform line resistance and stable voltage application.

What is claimed is:

1. An electrically-driven liquid crystal lens comprising:
   first and second substrates arranged opposite each other and each defining a plurality of lens regions to correspond to lens regions of the other substrate;
   a plurality of metal lines formed on the first substrate at one side thereof;
   a first insulating film formed on the first substrate including the metal lines;
   a plurality of first electrodes formed on the first insulating film in the respective lens regions, to intersect the plurality of metal lines;
   a second insulating film formed on the first electrodes;
   a plurality of second electrodes formed on the second insulating film including the first electrodes at positions alternating with the first electrodes with respect to the respective lens regions;
   a first contact structure between the first electrodes and the plurality of metal lines using a transparent electrode pattern of the same layer as the second electrodes;
   a second contact structure between the second electrodes and the plurality of metal lines;
   a common electrode formed over the entire surface of the second substrate; and
   a liquid crystal layer filled between the first substrate and the second substrate.

2. The lens according to claim 1, wherein the first contact structure includes:
   first contact holes formed by selectively removing the second insulating film above the first electrodes;

second contact holes formed by selectively removing the second and first insulating films above the metal lines; and the transparent electrode pattern formed to pass above the first contact holes and second contact holes while filling the first and second contact holes.

3. The lens according to claim 2, wherein the second contact structure includes third contact holes formed by selectively removing the second insulating film at intersections of the metal lines and the second electrodes.

4. The lens according to claim 3, wherein the second electrodes are formed to be buried in the third contact holes.

5. The lens according to claim 1, wherein the first substrate is divided into a plurality of sections each including a plurality of lens regions.

6. The lens according to claim 5, wherein signal lines, connected to the first electrodes and second electrodes via the first contact structure and second contact structure, are divided on a per section basis.

7. An electrically-driven liquid crystal lens comprising:
a first substrate defining a plurality of divided sections each including a plurality of lens regions;
a plurality of metal lines formed on the first substrate at an edge thereof on a per section basis;
a plurality of first electrodes formed on the first substrate with respect to each lens region of the plurality of divided sections while being spaced apart from one another by the same interval;
an insulating film formed on the first electrodes;
a plurality of second electrodes formed over the insulating film at positions alternating with the first electrodes with respect to the respective lens regions;
a second substrate opposite the first substrate;
a common electrode formed over the entire surface of the second substrate; and
a liquid crystal layer filled between the first substrate and the second substrate.

8. The lens according to claim 7, wherein the first electrodes are formed on a plurality of layers at different positions each other to correspond to the respective lens regions.

9. A stereoscopic display device comprising:
a display panel to emit 2-dimensional image signals; and
an electrically-driven liquid crystal lens to directly emit the 2-dimensional image signals from the display panel, or to convert the 2-dimensional image signals into 3-dimensional image signals so as to emit the 3-dimensional image signals,
wherein the electrically-driven liquid crystal lens includes:
a first substrate defining a plurality of divided sections each including a plurality of lens regions; a plurality of metal lines formed on the first substrate at an edge thereof on a per section basis; a plurality of first electrodes formed on the first substrate with respect to each lens region of the plurality of divided sections while being spaced apart from one another by the same interval; an insulating film formed on the first electrodes; a plurality of second electrodes formed over the insulating film at positions alternating with the first electrodes with respect to the respective lens regions; a second substrate opposite the first substrate; a common electrode formed over the entire surface of the second substrate; and a liquid crystal layer filled between the first substrate and the second substrate.

10. The lens according to claim 1, wherein the metal lines provide respective different voltages to corresponding ones of the first and second electrodes.

11. The lens according to claim 10, wherein the liquid crystal layer implements different optical pathways when corresponding electric fields are resultant from the different voltages being applied to the first and second electrodes to realize a lenticular effect.

12. The lens according to claim 1, wherein the first and second electrodes include line-shaped electrodes parallel to each other.

13. The lens according to claim 12, wherein the side of the first substrate having the metal lines is a pad region.

14. The lens according to claim 13, wherein the first and second contract structures are disposed in the pad region.

* * * * *